United States Patent Office 3,222,238
Patented Dec. 7, 1965

3,222,238
PROCESS FOR BONDING RUBBER TO LINEAR CONDENSATION POLYESTER STRUCTURES
Henry R. Krysiak, Wilmington, Del., assignor to E. I. du Pont de Nemours and Company, Wilmington, Del., a corporation of Delaware
No Drawing. Filed May 22, 1962, Ser. No. 196,605
9 Claims. (Cl. 156—330)

This invention relates to the treatment of shaped structures and more particularly to a method for treating shaped structures such as films and fibrous textile materials to improve their adhesion to rubber. Specifically, the invention provides a new and useful procedure for treating shaped structures of synthetic linear condensation polyesters to improve their ability to adhere to rubber under severe flexing conditions.

In contrast to the naturally occurring polymer fibers such as cotton and the older synthetic fibers such as nylon, the newer polyester fibers have been found particularly difficult to bond to rubber. The outstanding properties of polyethylene terephthalate fibers, and their commercial availability, have made it highly desirable that a good polyester-to-rubber adhesive be developed. A number of such adhesives have been proposed, but none of these have been fully satisfactory in practical applications. One particular disadvantage of the known adhesives has been an excessive loss of adhesion at elevated temperatures.

It is an object of this invention to provide an adhesive system which gives a superior adhesive bond between elastomer compositions and organic polymeric shaped structures. A further objective is to provide an adhesive system providing superior adhesion between elastomer compositions and synthetic linear condensation polyester fibers. A further objective is to provide such a system which is applicable with a variety of fibers and elastomer compositions. A still further objective is to provide such a system in which the components are stable both before and after application to the fibrous material, which does not require the use of inflammable solvents, and which can be applied with generally available equipment. Other objectives will appear hereinafter.

These and other objects are achieved by the process of the invention which comprises treating the fibrous textile material with an aqueous medium containing from about 5% by weight to about 25% by weight of solids of (A) a polyepoxide having an epoxy equivalent per 100 grams greater than about 0.20 and preferably having an average of at least two epoxy groups in each molecule, a melting point below about 150° C., and an average molecular weight below about 3,000, (B) epsilon-caprolactam, the mol ratio of A/B being within the range from about 0.05 to about 10.0, and (C) a minor amount of a caprolactam polymerization initiator. The treated material is dried at a temperature above 210° C. but below the melting point of the fiber, to effect a reaction between the epoxide and the lactam, and then treated with a liquid medium containing rubber, preferably a mixture of an aqueous resorcinol-formaldehyde solution and a butadiene-vinyl pyridine latex.

The invention will be more readily understood by the following simplified flow diagram of the steps for preparing the shaped structure of reinforced rubber using a synthetic polyester shaped structure as the reinforcing material:

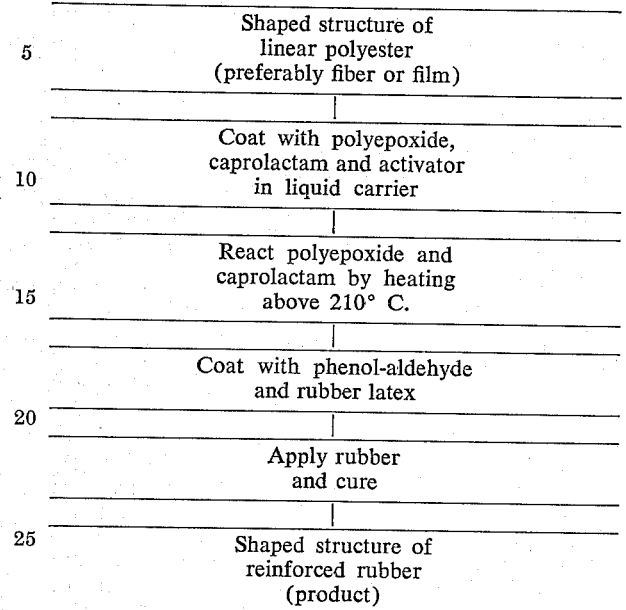

Shaped structure of
linear polyester
(preferably fiber or film)
|
Coat with polyepoxide,
caprolactam and activator
in liquid carrier
|
React polyepoxide and
caprolactam by heating
above 210° C.
|
Coat with phenol-aldehyde
and rubber latex
|
Apply rubber
and cure
|
Shaped structure of
reinforced rubber
(product)

As will be seen by following the various steps outlined, the polyester shaped structure (preferably a fiber or film) is coated with an aqueous mixture containing a polyepoxide, epsilon-caprolactam, and an activator, which coating is thereafter cured by heating to a temperature above 210° C., the structure is given a second coating with a phenol-aldehyde/rubber latex mixture and then the rubber is applied to give as a product a reinforced shaped structure.

The following examples illustrate specific embodiments of the invention. They are not intended to limit it in any manner.

In the examples illustrating the manner in which the invention may be carried out and the advantages obtained, the strength of the adhesive is determined by the "single-end strip adhesion test" (SESA), or the "H-pull" test.

In preparing samples for the single-end strip adhesion test, lengths of treated cord are placed in the bottom of a steel mold, the cords being parallel with a spacing of 1" between cords. The cords are placed under dead-weight tension to maintain their position. A sheet of unvulcanized compounded elastomer stock, 125 mils in thickness, is placed over the cords, covered with a cotton duck reinforcing backing, and the top plate of the mold placed over the backing. The mold is put into a platen press. A pressure of approximately 150 p.s.i. is applied and the mold is usually heated to about 145° C. for 60 minutes. Other vulcanizing conditions appropriate for individual elastomer compositions may be used. Due to the flow of the rubber stock, the pressure within the mold falls to a low value during the curing cycle. After cooling, the specimen is removed from the press and it is found that the cords are firmly imbedded in the cured elastomer stock, but are visible on the surface. This sheet is cut into 1" wide strips, each having a cord in the center of its width. The cord end is separated from one end of the strip; the free end of the elastomer strip so obtained is clamped in the upper jaw of an Instron testing machine and the freed end of cord in the lower jaw. The machine is then operated to separate the jaws and thereby to strip the cord from the elastomer sheet in a continuous manner. The tension necessary to strip the cord from the elastomer sheet is determined and is reported in pounds tension per single end of cord. For determination of hot adhesion, the sample is brought to a temperature of 140° C. and held there while the cord is stripped from the elastomer sheet.

The "H-pull" test is the well-known test described, for example, in India Rubber World, 114, 213–219 (May 1946), "Study of the H Test for Evaluating the Adhesive Properties of Tire Cord in Natural GR-S Rubber." Briefly, a dipped cord is cured across the center of two small rectangles of rubber with a short length of the cord exposed between the rubber pieces forming the crossbar of the H. The pieces of rubber are gripped in an Instron Tensile Testing machine and stress is applied so that the cord is pulled out from one of the pieces of rubber. The load required is regarded as a measure of the adhesion. In the examples of the present specification, the width of the rubber pieces are reduced to ¼ inch since greater width samples resulted in cord breaks rather than adhesive failure due to the high level of adhesion experienced with this new adhesive system.

The RFL coating of the examples is prepared by mixing 1.38 parts of resorcinol, 2.02 parts of 37% formaldehyde, 2.39 parts of 8.5% aqueous sodium hydroxide, and 27.8 parts of water. This mixture is aged for six hours at 75–78° F. and then added to a mixture of 30.5 parts of 41% solids butadiene/styrene/vinylpyridine (70/15/15) copolymer latex diluted with 7.64 parts water. The final mixture is allowed to age for 12 hours before using. After applying it to the shaped structure, the RFL mixture is cured at 190° C. to 245° C., preferably 205° C. to 212° C., for 30–90 seconds with an applied stretch of −2 to +5%. Usually the dry solids pickup in this step in tire cord treatment ranges from 2% to 7% by weight based upon the weight of the original cord.

The rubber stock (A) referred to in the examples is a blended natural rubber/styrene-butadiene rubber/-reclaimed rubber tire skim stock of approximately 49/20/31 composition by weight.

Rubber stock (B) has the following composition:

|   | Parts by weight |
|---|---|
| Smoked sheet blend | 90 |
| Rolled brown rubber | 10 |
| Zinc oxide | 2.8 |
| Statex B (FF Black) | 25.0 |
| Stearic acid | 1.4 |
| Pine tar | 2.1 |
| Staybelite resin | 2.0 |
| Aminox | 1.54 |
| RPA No. 2 | 0.042 |
| Retarder W | 0.3 |
| Captax | 0.55 |
| Sulfur | 2.87 |
|   | 138.602 |

EXAMPLE I

About 276 parts (3 moles) of glycerol was mixed with 832 parts (9 moles) of epichlorohydrin. To this reaction mixture was added 10 parts of diethyl ether solution containing about 4.5% boron trifluoride. The temperature of this mixture was between 50° C. and 75° C. for about 3 hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling at atmospheric temperature, the insoluble material was filtered from the reaction mixture and low boiling substances removed by distillation to a temperature of about 150° C. at 20 mm. pressure.

This polyepoxide is a pale yellow viscous liquid with an epoxide equivalent per 100 grams of about 0.67 and with a molecular weight of about 324 as measured in dioxane solution by the boiling-point-rise method.

To 273 ml. of water are added 11.3 grams of epsilon-caprolactam (3.7%), 20.4 grams of the polyepoxide (6.7%) described above, and 1.0 grams of the adipic acid salt of hexamethylenediamine (0.33%). The mixture is thoroughly stirred to insure solution and dispersion of the ingredients, and is then ready for use. A polyethylene terephthalate tire cord having a 1,100 denier/2-ply (120 tex/2-ply) construction with 12.5 turns per inch Z twist in the singles and 12.5 turns per inch S twist in the ply is dipped in the aqueous mixture prepared above, at room temperature, and heated in an oven for 1 minute at 224° C. under an applied stretch of 1% to give a precoated cord having a dried coating pickup of about 1.2% by weight.

The RFL coating is then applied as previously described, dried and cured at 210° C. for 1 minute using a 1% applied stretch. The doubly-coated cord, coded sample A, is then tested for adhesion in the single-end-strip-adhesion test previously described, with the result shown in Table I.

A second adhesive coated cord, coded sample B, is prepared in the same manner with the exception that the amount of adipic acid salt of hexamethylenediamine in the precoating composition is increased to 6.5 grams and sufficient water is added to give a total solids concentration of 8%. After the RFL coating is applied, adhesion is tested as shown in the table.

Table I

| Cord Sample | Test | Rubber Stock A, 24° C. | Rubber Stock B | |
|---|---|---|---|---|
|   |   |   | 24° C. | 140° C. |
| A | SESA, lbs | 9.8 | 6.1 | 4.6 |
|   | "H-pull", lbs |   | 31.1 | 18.7 |
| B | SESA, lbs | 8.0 | 5.0 | 3.2 |

In the same SESA test, cords treated with RFL only give values less than 1.0 lb.

EXAMPLE II

A series of experiments are carried out to demonstrate the importance of the basic ingredients of the precoating adhesive composition. The general procedure is substantially the same as that described in Example I. A polyethylene terephthalate tire cord is first coated with the precoating composition indicated in Table II, cured at an elevated temperature, and then overcoated with an RFL mixture as described previously. The effectiveness of the adhesive coating is determined in a hot single-end-adhesion test using rubber stock "B". The results are summarized in Table II.

Table II

| Precoating composition: | SESA, lbs. (140° C.) |
|---|---|
| None | Nil |
| 5% polyepoxide (Ex. I) | 1.6 |
| 5% caprolactam+0.1% NaOH | Nil |
| 10% caprolactam+0.25% 66 salt | Nil |
| 10% polyepoxide+0.1% NaOH | 0.99 |
| 6.15% polyepoxide+3.4% caprolactam +0.12% NaOH | 2.4 |
| 8% polyepoxide+3% caprolactam+0.4% 66 salt | 3.6 |

(NOTE.—66 salt is the adipic acid salt of hexamethylenediamine.)

EXAMPLE III

A sample of 7.5 mil polyethylene terephthalate film is coated with an aqueous mixture containing 12.4% of the polyepoxide of Example I, 7.0% epsilon-caprolactam, and 0.66% adipic acid salt of hexamethylenediamine. The coated film is cured 45 seconds at 225° C., overcoated with a resorcinol-formaldehyde-latex composition, dried and cured for 1 minute at 205° C. The adhesive coated film is pressed against a sample of "A" rubber and cured for 45 minutes at 145° C. In a peel test in which an attempt is made to peel the film from the rubber, failure occurs only within the rubber. The film-rubber interface remains firmly bonded.

EXAMPLE IV

Polyethylene terephthalate tire cord of 1,100 denier/2-ply construction is coated with an adhesive according to the general procedure of Example I, using the following mixture as the precoating composition:

| | Grams |
|---|---|
| Epsilon-caprolactam | 226 |
| Polyepoxide of Example I | 300 |
| Nylon 66 salt | 24 |
| Water | 4040 |

The hot stretching conditions after precoating utilize a temperature of 235° C. for 60 seconds with an applied stretch of 1.5%, and the hot stretching conditions following the resorcinol-formaldehyde-vinylpyridine latex dip utilize a temperature of 212° C. for 60 seconds with an applied stretch of —0.5%. Dry solids pickup amount to 1.2% by weight for the precoat and 3.7% by weight for the fully processed double coated cord.

Hot "H-pull" tests in "A" rubber at 140° C. give an average value of 18.2 lbs. for 16 samples.

The adhesive-coated cord prepared above is used to build a 4-ply, 8.50 x 14 automobile tire by standard methods known to the art. The skim stock used is rubber stock "A" described previously, and the tread stock is all butadiene/styrene rubber. The tire is inflated to 22 p.s.i. and then subjected to a high speed endurance test in which the tire is run against a steel wheel, 5.6 ft. in diameter, at 75 m.p.h. with a load of 1,325 lbs. applied to the tire, which is 110% of the maximum permissible load recognized by the Tire and Rim Association. The ambient temperature during the test is 100° F.

Two tires are prepared and tested according to the above procedure. One of them runs 2,627 miles before tread separation is observed. The other shows no failure in the 3,000 mile test. These results are in contrast to the average tread separation mileage of about 600 observed for tires constructed of polyethylene terephthalate cords dipped with the resorcinol-formaldehyde-latex formula only.

EXAMPLE V

A commercially available liquid condensation product of epichlorohydrin and glycerine corresponding to the epoxide of Example I and sold under the trademark "Epon" 812, by Shell Chemical Corporation, is used to prepare the following adhesive subcoating mixture:

| | Grams |
|---|---|
| "Epon" 812 | 102.0 |
| Epsilon-caprolactam | 56.5 |
| 66 nylon salt | 5.0 |
| Water | 654 |

Portions of this mixture, which has a solids content of 20%, are diluted with appropriate amounts of water to give mixtures having 15%, 10%, and 5% total solids. These mixtures are applied to polyethylene terephthalate cords of 1,100/2 construction in the manner described in Example I and overcoated with the standard RFL adhesive mixture. The treated cords are then tested for adhesion in the single-end-strip-adhesion test with the following results:

*Table III*

| Concentration of Precoating Composition Percent | Single-end-strip-adhesion, lbs. | | | |
|---|---|---|---|---|
| | "A" Rubber | | "B" Rubber | |
| | Hot | Cold | Hot | Cold |
| 20 | 1.6 | 5.7 | 3.4 | 4.4 |
| 15 | 1.5 | 5.5 | 3.5 | 4.3 |
| 10 | 1.5 | 5.7 | 3.2 | 4.7 |
| 5 | 0.9 | 2.9 | 2.0 | 3.6 |

The procedure is repeated using the higher molecular weight polyepoxide sold under the trademark "Epon" 820 (Shell Chemical Corporation) as the polyepoxide. Substantially equivalent results are obtained.

EXAMPLE VI

A commercially available polyepoxide which is a condensate of resorcinol and diglycidylether, sold under the trademark "Kopoxite" 159, by the Koppers Co., Pittsburgh, Pa., is used to prepare the following mixture:

| | Percent |
|---|---|
| "Kopoxite" 159 | 12.4 |
| Epsilon-caprolactam | 7.0 |
| 66 nylon salt | 0.66 |
| Water | 80 |

This mixture is applied to a polyethylene terephthalate cord of 1,100/2 construction which is then cured at 225° C. for 1 minute under 1% applied stretch to give a dry solids pickup of 2.5%. The cord is then overcoated with the standard RFL adhesive mixture and again cured at 210° C. for 1 minute using an applied stretch of 1%. The total dry solids pickup is 6.5%. In the single-end-strip-adhesion test using "A" rubber the cord is found to give a value of 7.1 lbs. when tested at room temperature.

The above procedure is repeated with only "Kopoxite" 159 and water present in the precoating composition. A SESA value of only 0.8 lb. is obtained.

EXAMPLE VII

A series of experiments are carried out to demonstrate the operability of various precoating compositions in which the ratio of caprolactam to polyepoxide is varied over a wide range. The following coating compositions are prepared:

"A"

| | Grams |
|---|---|
| Epsilon-caprolactam | 11.3 |
| "Epon" 812 | 15 |
| Nylon 66 salt | 1.5 |
| Water | 250 |

"B"

| | |
|---|---|
| Epsilon-caprolactam | 16.9 |
| "Epon" 812 | 15 |
| Nylon 66 salt | 1.7 |
| Water | 250 |

"C"

| | |
|---|---|
| Epsilon-caprolactam | 28 |
| "Epon" 812 | 15 |
| 66 salt | 2 |
| Water | 405 |

"D"

| | |
|---|---|
| Epsilon-caprolactam | 56 |
| "Epon" 812 | 15 |
| 66 salt | 3 |
| Water | 666 |

The general procedure is substantially the same as that described in Example V. A sample of polyethylene terephthalate tire cord of 1,100/2 construction is first coated with one of the above precoating compositions, cured at 225° C. for 1 minute under 1% applied stretch, and then overcoated with a standard RFL mixture which is cured at 210° C. for 1 minute using a 1% applied stretch. The treated cords are tested for adhesion in both the single-end-strip-adhesion and the "H-pull" test with the results shown in the table.

*Table IV*

| Sample | Mol Ratio Caprolactam/epoxy | SESA, lbs. 140° C. | SESA, lbs. 24° C. | "H-pull" 140° C. |
|---|---|---|---|---|
| A | 2 | 2.8 | 4.2 | 18.5 |
| B | 3 | 3.0 | 4.6 | 17.8 |
| C | 5 | 2.8 | 4.5 | 19.1 |
| D | 10 | 2.3 | 4.6 | 19.1 |

The term "polyepoxide" is used to describe uncured chemical compounds having an average of at least 2 epoxy groups, i.e., at least two

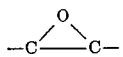

in each molecule, a melting point below 150° C., and average molecular weight below 3,000, and an epoxy equivalent per 100 grams greater than about 0.2. The preferred epoxy compounds are the liquid aliphatic epoxy compounds which are soluble or easily dispersible in water. They may be saturated or unsaturated, and may contain substituents for hydrogen such as alkyl, halogen, hydroxyl, and alkoxy. Such compounds are commonly prepared by the reaction of halohydrins with polyhydric alcohols; as for example, the reaction of epichlorohydrin with glycerol. Such compounds are disclosed in Epoxy Resins by Lee and Neville, McGraw-Hill Book Co., Inc. (New York, 1957), pp. 1–21. The term "epoxide equivalent" is the weight in resin in grams which contain 1 gram chemical equivalent of epoxy groups. The value is determined by the method described in Lee and Neville at page 21.

The term "caprolactam polymerization initiator" is intended to refer to any material which, when present in catalytic quantities, is capable of catalyzing or promoting the polymerization of epsilon-caprolactam. Many such materials have been described in patents, e.g., U.S. Patent No. 2,251,519, French Patent No. 886,482, and French Patent No. 894,096. Initiators are also discussed by Floyd in Polyamide Resins, page 58, Reinhold Publishing Corporation, New York, 1958. Included are such compounds as the alkali metal hydroxides, benzyltrimethylammonium hydroxide, sodium adipate, epsilon-amino-caproic acid, and piperidine. Best results are obtained, however, with the nylon salts such as the adipic acid salt of hexamethylenediamine, the adipic acid salt of ethylenediamine, the oxalic acid salt of hexamethylenediamine, and the oxalic acid salt of ethylenediamine. Using nylon salts, it is usually preferred that the initiator be present in the amount of 2% to 25%, based on the weight of epsilon-caprolactam.

The polyepoxide-caprolactam-activator reactants are applied in a liquid carrier to the shaped structure. A special advantage of this adhesive system is the fact that water may be used as the liquid carrier. No organic solvents are required. Water has the obvious advantages of ready availability, low cost, safety, convenience of use, and easy disposability. The concentration of reactants in the carrier may vary widely, but generally the use of compositions containing from about 5 to about 25% by weight of reactants wherein the mol ratio of polyepoxide to caprolactam is between about 0.05 to about 10.0 is satisfactory. Preferably the ratio of reactants is between about 0.2 and about 3.

In addition to the polyepoxide, the caprolactam, and the caprolactam polymerization initiator, the aqueous precoating composition of this invention may also contain, if desired, optional materials, such as wetting agents, dispersing agents, viscosity builders, and epoxide curing agents and promoters. For example, commercially available wetting agents may be used to assist the aqueous adhesive mixture in wetting the polymeric substrate to which it is applied. The viscosity of the coating composition may be adjusted by the addition of well-known thickening agents, such as gum tragacanth, in minor amounts. As pointed out previously, after applying the liquid carrier containing the polyepoxide-carprolactam reactants to the shaped structure it is necessary that the reaction be made to occur between the reactants. Generally, it is convenient to accomplish this during the drying operation where heat is customarily applied. A temperature of at least 210° C. is normally required. Preferably, the curing is carried out at a temperature in the range 225° to 235° C. Curing times of 30 seconds to 15 minutes may be used, with times in the range 30 to 60 seconds being preferred. As expected, the higher temperatures require shorter curing times. The upper limit of temperatures which may be employed is dependent upon the softening point of the polymeric substrate rather than upon the adhesive itself. When treating fibrous structures such as tire cord, it is generally preferable to perform this curing operation with the structure under at least sufficient tension to prevent significant shrinkage. At times it is advantageous to apply sufficient tension to stretch the structure during this operation. When the composition is applied as taught herein, the shaped structure wil pick up a coating of reactants constituting from about 0.5% to about 5% by weight of the coated structure. Generally it is preferred to adjust concentrations and conditions of application to provide a coated structure containing reactants constituting about 1% to about 3% by weight of the coated structure.

Before being bonded to rubber, it is essential that the polymer structure bearing the cured polyepoxide-caprolactam coating be given a second coating of a composition containing a rubber, preferably a composition containing a phenol-aldehyde condensate (e.g., as disclosed in U.S. Patent No. 2,330,217 to Hunn, September 28, 1943) and a butadiene-vinylpyridine latex. Such compositions and their method of application are well known in the art, as illustrated by U.S. Patent No. 2,990,313 to Knowles et al., June 27, 1961. Usually it is preferred that the phenol-aldehyde latex mixture be applied to give a dry weight pickup falling in the range 2% to 7%.

The polymeric structure bearing the cured polyepoxide-caprolactam coating overcoated with the phenolaldehyde latex adhesive mixture as described may be bonded to rubber in the customary manner by use of heat and pressure to form reinforced articles in which both the dry and wet adhesion of the synthetic polymer to rubber is outstanding, and in which both cold and hot adhesion, using polyester fibers, is superior to that given by any adhesive described in published literature. The adhesion afforded by the composition of this invention is superior on polyester structures over a broad range of application and testing conditions and in a wide variety of rubber stocks. While the composition is particularly valuable for polyester structures, it is to be understood that it is also suitable for other polymeric structures, such as polyamide structures, as well as cellulosic structures and the natural fibers.

The nature of the "rubber" in the final shaped structure is not critical and may be either a nautral or a synthetic rubber. Furthermore, the technique of applying the rubber to the reinforcing structure prepared in accordance with the present invention (e.g., film, fiber or the like) is accomplished by conventional and well-known techniques. It will be apparent to those skilled in the art that the rubber stock applied may contain additives such as vulcanizers, fillers, pigments, antioxidants, and the like.

Compositions produced according to the present invention may be utilized for a wide variety of important industrial applications. They may be used, for example, in the preparation of pneumatic tires for automobiles, buses, tractors, and aircraft, in transmission belts, conveyor belts, floor tiles, hoses, raincoats, luggage, and the like.

The process of the invention may be applied to the treatment of any fibrous material useful in the reinforcing of rubber products, such as cotton, rayon, nylon, and the like. However, especially valuable results are obtained when the invention is applied to polyester fibers and other shaped structures such as those prepared from polyethylene terephthalate, because of the inadequacy of previously known adhesive systems. Illustrative of the polyesters useful in preparing shaped structures which may be bonded to rubber by the process of this invention are those disclosed in U.S. Patent No. 2,465,319, No. 2,965,613, and No. 2,901,466.

Since many different embodiments of the invention may be made without departing from the spirit and scope thereof, it is to be understood that the invention is not limited by the specific illustrations except to the extent defined in the following claims.

I claim:

1. The process for bonding rubber to a shaped structure composed of a linear condensation polyester which comprises (1) coating the structure with an aqueous medium containing about 5% to about 25% by weight of dispersed solids of (A) polyepoxide having an epoxy equivalent per 100 grams greater than about 0.20 and an average of at least about two epoxy groups per molecule, a melting point below about 150° C., and an average molecular weight below about 3000, (B) epsilon-caprolactam in a mol ratio of the polyepoxide to the caprolactam the range from about 0.05 to about 10.0, and (C) a catalytic amount of caprolactam polymerization initiator; (2) reacting the polyepoxide with the caprolactam by heating the coated structure to a temperature above 210° C. and below the melting point of the polyester until the coating is dry; (3) overcoating the structure with an aqueous phenol-aldehyde and butadiene-vinyl pyridine rubber latex mixture; (4) drying and curing the overcoating; (5) applying and curing a layer of rubber on the coated structure.

2. A process as defined in claim 1 wherein the overcoating is a mixture of aqueous resorcinol-formaldehyde solution and a butadiene-vinyl pyridine latex.

3. A process as defined in claim 1 wherein the mol ratio of the polyepoxide to the caprolactam is between about 0.2 and about 3.

4. A process as defined in claim 3 wherein the aqueous coating medium contains 2% to 15% by weight of the polyepoxide and 2% to 8% by weight of the epsilon-caprolactam.

5. A process as defined in claim 1 wherein the polymerization initiator is a nylon salt present in the amount of 2% to 25% by weight of the caprolactam.

6. A process as defined in claim 1 wherein step (2) is accomplished by heating to a temperature in the range of 225° to 235° C. for at least 30 seconds.

7. A process as defined in claim 1 wherein the coating of polyepoxide and epsilon-caprolactam is from about 0.5% to about 5% by weight of the coated structure.

8. A process as defined in claim 1 wherein the coating of reactant solids applied in step (1) constitutes about 1% to about 3% by weight of the coated structure.

9. A process as defined in claim 1 wherein the phenol-aldehyde and rubber latex applied in step (3) provides a dried coating within the range of 2% to 7% by weight of the coated structure.

References Cited by the Examiner
UNITED STATES PATENTS

| | | | |
|---|---|---|---|
| 2,847,341 | 8/1958 | Kohn. | |
| 2,902,398 | 9/1959 | Schroeder | 154—52 |
| 2,922,727 | 1/1960 | Levison | 154—52 |
| 2,962,468 | 11/1960 | Groves. | |
| 3,036,948 | 5/1962 | Danielson | 154—46 |

ALEXANDER WYMAN, *Primary Examiner.*

EARL M. BERGERT, *Examiner.*